US009762638B2

(12) United States Patent
Naito (10) Patent No.: US 9,762,638 B2
(45) Date of Patent: Sep. 12, 2017

(54) IMAGE PROCESSING APPARATUS, INFORMATION PROCESSING METHOD, AND STORAGE MEDIUM

(71) Applicant: CANON KABUSHIKI KAISHA, Tokyo (JP)

(72) Inventor: Yosui Naito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/222,483

(22) Filed: Mar. 21, 2014

(65) Prior Publication Data
US 2014/0294017 A1 Oct. 2, 2014

(30) Foreign Application Priority Data

Mar. 27, 2013 (JP) .................................. 2013-067076

(51) Int. Cl.
*H04L 29/06* (2006.01)
*H04N 1/00* (2006.01)

(52) U.S. Cl.
CPC .......... *H04L 65/602* (2013.01); *H04L 65/103* (2013.01); *H04L 65/1006* (2013.01); *H04L 65/80* (2013.01); *H04L 69/08* (2013.01); *H04L 69/169* (2013.01); *H04N 1/0022* (2013.01)

(58) Field of Classification Search
CPC . H04L 65/602; H04L 65/1006; H04L 65/103; H04L 65/80; H04L 65/169; H04L 69/08; H04L 69/169; H04N 1/00204; H04N 1/0022
See application file for complete search history.

(56) References Cited

U.S. PATENT DOCUMENTS

| 2002/0027913 | A1 | 3/2002 | Tajiri et al. |
| 2005/0207547 | A1* | 9/2005 | Kajiwara ............... H04M 15/16 379/100.01 |
| 2007/0229910 | A1* | 10/2007 | Ulybin .......................... 358/405 |
| 2008/0117477 | A1* | 5/2008 | Fujise ........................... 358/468 |
| 2008/0174826 | A1* | 7/2008 | Fujino ................ H04N 1/00209 358/3.03 |

(Continued)

FOREIGN PATENT DOCUMENTS

| CN | 100407696 C | 7/2008 |
| JP | P2002-158702 A | 5/2002 |
| JP | 2009017383 A | 1/2009 |

OTHER PUBLICATIONS

Zhang Jing-Lei, Sun Jian-Wei, "Design and Implementation of Real-Time Facsimile Module in Embedded SIP Voice Gateway", Computer System Application, Jun. 19, 2010, pp. 109-113, vol. 19, No. 06, China Academic Journal Electronic Publishing House.

*Primary Examiner* — Kwang B Yao
*Assistant Examiner* — Moo Ryong Jeong
(74) *Attorney, Agent, or Firm* — Canon U.S.A., Inc. IP Division (57) ABSTRACT

A facsimile apparatus includes a determination unit configured to determine whether a transmission destination is a gateway that uses a protocol for performing fax communication in real time on the IP network, and a control unit configured to perform control, if the determination unit determines that the transmission destination is a gateway apparatus, to transmit a packet of a smaller size and add a smaller number of redundant packets compared to when the transmission destination is not a gateway apparatus.

8 Claims, 6 Drawing Sheets

(56) References Cited

U.S. PATENT DOCUMENTS

2012/0110403 A1* 5/2012 Chen et al. .................. 714/748
2013/0050769 A1 2/2013 Hama
2013/0166674 A1* 6/2013 Olsen ..................... H04L 69/08
                                                                             709/217

* cited by examiner

| | | |
|---|---|---|
| 601 | PHONE NUMBER | 0441112222 |
| 602 | CONNECTION DESTINATION TYPE | T.38 GW1 |
| 603 | ECM | VALID |
| 604 | START SPEED | 14400bps |

FIG. 4

| 401 | 402 | 403 |
|---|---|---|
| ORDER OF PRIORITY | CONNECTION DESTINATION TYPE | NUMBER CONDITION (PREFIX MATCH) |
| 1 | T.38 GW2 | 0346 |
| 2 | T.38 GW2 | 0348 |
| 3 | Intranet | 626 |
| 4 | Intranet | 0 |

| | |
|---|---|
| 404 — CONNECTION DESTINATION IN CASE OF MISMATCH | Intranet |

IMAGE PROCESSING APPARATUS, INFORMATION PROCESSING METHOD, AND STORAGE MEDIUM

BACKGROUND

Field

The present subject matter relates to a facsimile apparatus, a control method thereof, and a storage medium.

Description of Related Art

In recent years, a method for performing facsimile (fax) communication using the Internet protocol (IP) network has become established. The fax communication using the IP network employs Session Initiation Protocol (SIP) as a call connection protocol, and T.38 protocol for performing data communication. Since such fax communication using the IP network is performed via the IP network, communication is performed at a higher speed as compared to a conventional G3 fax. Further, a SIP and T.38-enabled Internet fax apparatus (hereinafter referred to as an IP fax) is currently in the market.

Furthermore, a T.38 gateway (T.38 GW) which converts in real time an analog fax signal of the G3 fax into the T.38 protocol is also available in the market. The T.38 GW thus allows the SIP and T.38-enabled IP fax and the conventional G3 fax to communicate with each other.

Communication using the T.38 protocol utilizes, for the transport layer, either Transmission Control Protocol (TCP)/ Transport Protocol Data Unit Packet (TPKT), or User Datagram Protocol (UDP)/UDP Transport Layer Protocol (UDPTL).

The protocols available for communication using the T.38 protocol are determined as below according to environmental specifications in which IP fax communication is to be performed.

Public IP network: TCP/TPKT, UDP/UDPTL

Local IP network A (using a predetermined exchanger): UDP/UDPTL

Local IP network B (using peer-to-peer (P2P) method): TCP/TPKT, UDP/UDPTL

T.38 GW: UDP/UDPTL

The predetermined exchanger is a local IP exchanger which includes an SIP server and resolves on the local IP network a connecting destination address based on a destination telephone number. Further, P2P is a communication method which directly connects terminals to each other on the IP network to allow the terminals to transmit and receive data using IP addresses thereof.

If the size of an internet facsimile protocol (IFP) packet is increased and the number of packets is decreased in both the TCP/TPKT and UDP/UDPTL protocols, extra data of a header portion to be transmitted to the network can be decreased. Throughput is thus improved. Further, in the case of using the UDP/UDPTL protocol, if the number of redundant packets for performing error recovery is increased, tolerance to packet loss is improved. However, if the number of redundant packets is excessively increased, the throughput is lowered, so that real-time property becomes degraded.

Thus, it is necessary to appropriately determine the packet size according to the environment in which communication using the T.38 protocol is to be performed.

Japanese Patent Application Laid-Open No. 2002-158702 discusses a method for determining the packet size for a GW apparatus and a router apparatus. More specifically, Japanese Patent Application Laid-Open No. 2002-158702 is directed to a technique for reducing, when performing real-time communication such as voice communication, a packet delay time, and at the same time improving the throughput when performing non-real-time communication such as data communication including a file transfer. Japanese Patent Application Laid-Open No. 2002-158702 thus discusses a technique for dividing and transmitting packets when performing real-time communication.

Among T.38 GWs used for performing communication between the T.38-enabled IP fax and the G3 fax, there is a GW in which restrictions are placed on a receivable packet size. More specifically, the total size of the packet is restricted to less than 320 bytes, and the size of the IFP packet is restricted to less than 128 bytes.

For this reason, there is a problem in that the packet not satisfying the above-described restrictions on the packet size becomes discarded on the T.38 GW side, so that IP fax communication cannot be normally performed. Japanese Patent Application Laid-Open No. 2002-158702 does not discuss adjusting the packet size with respect to the size restrictions on the above-described data portion.

In general, when communicating with a T.38 GW, the UDP/UDPTL protocol is available for the transport layer in the T.38 protocol. In the case of a Voice over IP gateway (VoIP GW) used for voice communication, a small amount of packet loss which occurs in VoIP is negligible, so that the UDP protocol is generally used. Since the T.38 GW is a variation of the VoIP GW, the T.38 GW also generally uses the UDP protocol.

Thus, the above-described size restrictions can be overcome by performing packetization, specifically, by reducing the size of the IFP packet of a UDPTL packet and decreasing the number of redundant packets used for error recovery. However, if the packet size is uniformly reduced regardless of the connection destination, the data amount of the header portion to be transmitted to the network relatively increases, so that the throughput is lowered in the environment other than the T.38 GW. Further, if the number of redundant packets used for error recovery becomes small, the tolerance to packet loss may also be lowered.

SUMMARY

The present subject matter is directed to a technique for enabling normal communication if a connection destination is a gateway using a protocol for performing real-time fax communication on the IP network. Further, the present subject matter is directed to a technique for preventing a throughput and a tolerance to packet loss from lowering if the communication destination is other than the above-described gateway.

According to an aspect of the present subject matter, a facsimile apparatus includes an interface configured to connect to an IP network, a communication unit configured to perform facsimile communication by transmitting a packet from the interface, a determination unit configured to determine whether the facsimile communication to be performed by the communication unit is via a gateway apparatus for converting a packet received from the IP network into an analog signal and transmitting the analog signal to an analog network, and a control unit configured to, if the determination unit determines that the facsimile communication to be performed by the communication unit is via the gateway apparatus, control the communication unit to transmit a packet of a smaller size than when the facsimile transmission to be performed by the communication unit is not via the gateway apparatus.

According to another aspect of the present subject matter, a facsimile apparatus includes an interface configured to connect to an IP network, a communication unit configured to perform facsimile communication by transmitting a packet from the interface, a determination unit configured to determine whether the facsimile communication to be performed by the communication unit is via a gateway apparatus for converting a packet received from the IP network into an analog signal and transmitting the analog signal to an analog network, and a control unit configured to, if the determination unit determines that the facsimile communication to be performed by the communication unit is via the gateway apparatus, control the communication unit to add a smaller number of redundant packets than when the facsimile transmission to be performed by the communication unit is not via the gateway apparatus.

Further features of the present subject matter will become apparent from the following description of exemplary embodiments with reference to the attached drawings.

DETAILED DESCRIPTION

Various exemplary embodiments, features, and aspects of the claimed subject matter will be described in detail below with reference to the drawings.

Figure 1:
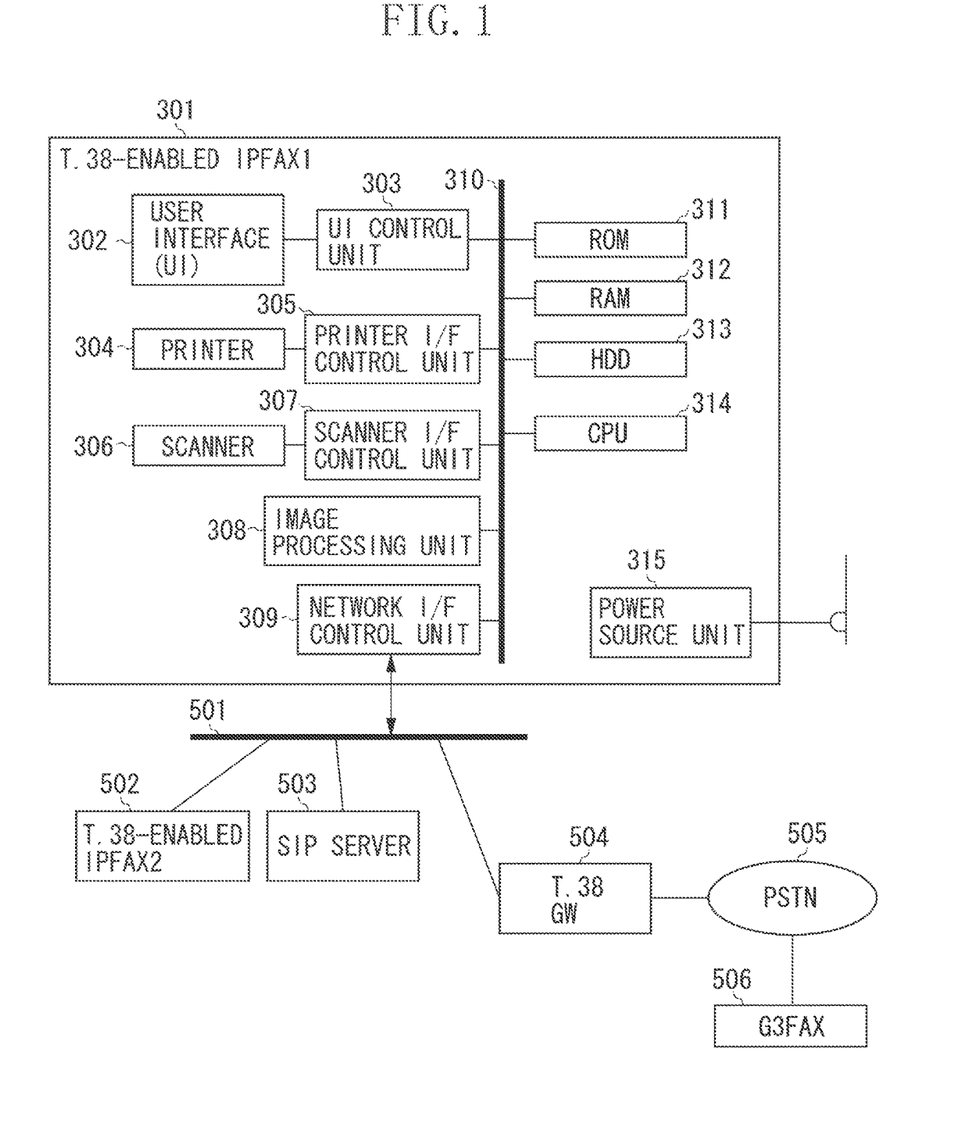
FIG. 1 illustrates an example of a hardware configuration of a T.38-enabled IP fax and a system configuration including the IP fax.

FIG. 1 illustrates an example of a hardware configuration of a T.38-enabled IP fax and a system configuration including the IP fax according to a first exemplary embodiment.

Referring to FIG. 1, an IP fax (IPFAX1) 301, which is T.38-enabled, is connected to a local IP network 501.

The IPFAX1 301 is communicable via a SIP server 503 with an IPFAX2 502 which is T.38-enabled.

A T.38 GW 504 with a modem built therein extracts, from a received T.38 packet, fax control signal information and coded data of an image included in the IFP packet. The T.38 GW 504 then uses the modem to modulate and convert the extracted information and data into an analog fax signal. Further, the T.38 GW 504 uses the modem to demodulate a received analog fax signal into digital data, and extracts and converts the digital data into a T.38 packet.

The local IP network 501 is connected via the T.38 GW 504 to a public switched telephone network (PSTN) 505.

A G3 FAX 506, which is only analog fax communication-enabled, is connected to the PSTN 505.

The IPFAX1 301 is communicable with the G3 FAX 506 via the T.38 GW 504.

Further, the IPFAX1 301 includes an image input/output function, and thus receives an input of a paper document and prints it out on a sheet.

Furthermore, the IPFAX1 301 is capable of printing input image information on a sheet, storing it as digital data, or transferring it to other devices via the IP network or fax.

In general, the IPFAX1 301 is constantly connected to the local IP network 501 and collectively managed along with other image processing apparatuses, personal computers (PC), and servers.

Further, the IPFAX1 301 is capable of receiving print data from a PC or image information from other terminals to print it on a sheet.

Furthermore, the IPFAX1 301 is capable of performing processing according to a user instruction received via a user interface (UI) 302.

The internal configuration of the IPFAX1 301 will be described below.

A power source unit 315 in the IPFAX1 301 is connected to a commercial power source to supply power to and activate the units included in the IPFAX 301.

A bus 310 electrically connects a scanner interface (I/F) control unit 307, a central processing unit (CPU) 314, a read-only memory (ROM) 311, a random access memory (RAM) 312, a hard disk drive (HDD) 313, a printer I/F control unit 305, a UI control unit 303, an image processing unit 308, and a network I/F control unit 309 to each other to allow data transmission. The bus 310 is used as a system bus on which control signals from the CPU 314 and data signals between the units are transmitted and received.

The CPU 314 controls the entire apparatus by reading a control software program of the IPFAX1 301 from the ROM 311 or the HDD 313, loading the program into the RAM 312, and then executing it.

The ROM 311 stores a boot program and fixed parameters of the apparatus, and a flash memory is frequently used as the ROM 311.

The RAM 312 is a semiconductor memory, and is used for temporarily storing work data, image data, or print data when the CPU 314 controls the IPFAX1 301.

The HDD 313 stores various data such as image data, print data, and address registration information.

Further, the RAM 312 and the HDD 313 are used as a work area when the CPU 314 performs image processing, coding/decoding, and resolution conversion of image data.

The image processing unit 308 performs, by using hardware, image processing, coding/decoding, and resolution conversion for enhancing the image quality of image data.

Furthermore, the RAM 312 and the HDD 313 are used as a work area when the CPU 314 decodes and encodes the data to be transferred, or processes the IP packet.

The UI control unit 303 controls the UI 302, displays various types of information, and inputs an instruction from the user.

The printer I/F control unit 305 controls a printer 304.

The scanner I/F control unit 307 controls a scanner 306.

The network I/F control unit 309 controls transmission and reception of data between the IPFAX1 301 and the local IP network 501, and analyzes and generates an IP packet such as a TCP packet and a UDP packet.

The RAM 312 and the HDD 313 temporarily stores the data to be transmitted or received through transmission or reception of an IP packet. The CPU 314 then interprets the data and processes the data according to the protocol specification. Further, the IPFAX1 301 can perform call connection and data communication with an apparatus at the other end by using an SIP session via the network I/F control unit 309 and the local IP network 501.

The CPU 314 receives a T.38 packet from the local IP network 501 via the network I/F control unit 309 to analyze the packet.

The flow of data when the IPFAX1 301 performs fax communication using the T.38 protocol will be described below.

It is assumed here that a correspondence between a phone number, and a uniform resource identifier (URI) of a connection destination indicated by the phone number is previously registered in the SIP server 503. The URI is an identifier indicating the destination address on the IP network.

First, a case where the IPFAX1 301 performs IP fax communication with the IPFAX2 502 will be described below.

The CPU 314 activates the scanner 306 via the scanner I/F control unit 307 to cause the scanner 306 to read a document, and obtains image data.

Upon completion of obtaining the image data, the network I/F control unit 309 transmits to the SIP server 503 a SIP connection request (i.e., an INVITE signal).

The SIP server 503 receives the INVITE signal. The SIP server 503 then searches for the corresponding URI based on the destination phone number included in the INVITE signal, and transfers the INVITE signal to the matched URI (i.e., the IPFAX2 502 in the present example).

If the IPFAX2 502 can receive the INVITE signal, the IPFAX2 502 transmits a 200 OK signal to the IPFAX1 301 via the SIP server 503.

Accordingly, a call has been established between the IPFAX1 301 and the IPFAX2 502.

The CPU 314 then causes the image processing unit 308 to convert the scanned image data into coded data such as Joint Bi-Level Image Experts Group (JBIG) coded data.

The network I/F control unit 309 converts the coded data into a T.38 packet, and transfers the packet to the IPFAX2 502 via the local IP network 501.

Further, the network I/F control unit 309 receives via the local IP network 501 a T.38 packet transmitted from the IPFAX2 502. The network I/F control unit 309 then extracts the coded digital image data to transmit it to the CPU 314.

The CPU 314 decodes the JBIG-coded digital image data into raw image data, transmits the decoded data to the printer I/F control unit 305 as the received data, and causes the printer 304 to print the received data.

Next, a case where the IPFAX1 301 performs fax communication with the G3 FAX 506 will be described below.

The CPU 314 activates the scanner 306 via the scanner I/F control unit 307 to causes the scanner 306 to read a document, and obtains the image data.

Upon completion of obtaining the image data, the network I/F control unit 309 transmits an INVITE signal to the T.38 GW 504.

Upon reception of the INVITE signal, the T.38 GW 504 obtains the phone number of the destination from the INVITE signal, and dials the PSTN 505.

The G3 FAX 506 then receives an incoming call and closes the line.

Upon detection of closing the line, the T.38 GW 504 transmits a 200 OK signal, in response to the INVITE signal, to the IPFAX1 301 via the local IP network 501.

Accordingly, a call has been established between the IPFAX1 301 and the G3 FAX 506.

The CPU 314 then causes the image processing unit 308 to convert the scanned image data into coded data such as JBIG coded data.

The network I/F control unit 309 converts the coded data into a T.38 packet, and transmit the packet to the T.38 GW 504.

At this time, the T.38 packet conforms to the UDP/UDPTL protocol according to the specifications of the T.38 GW 504.

The T.38 GW 504 analyzes the received T.38 packet and extracts the data from the IPF packet portion. Further, the T.38 GW 504 uses the built-in modem to modulate in real time the extracted data into a T.30 analog fax signal. The modulated analog fax signal is transmitted to the G3 FAX 506 via the PSTN 505. Further, a T.30 analog fax signal transmitted from the G3 FAX 506 is transmitted to the T.38 GW 504 via the PSTN 505.

The T.38 GW 504 uses the built-in modem to demodulate the received analog fax signal in real time to extract digital data. The T.38 GW 504 then converts the extracted data into a T.38 packet, and transmits the packet to the IPFAX1 301 via the local IP network 501.

The network I/F control unit 309 receives the transmitted T.38 packet, and the CPU 314 analyzes the received packet. If the received packet includes image data, the CPU 314 extracts the JBIG-coded digital image data and decodes it into raw image data. The CPU 314 transmits the decoded data as the received data to the printer I/F control unit 305, and causes the printer 304 to print the data.

Figure 2:
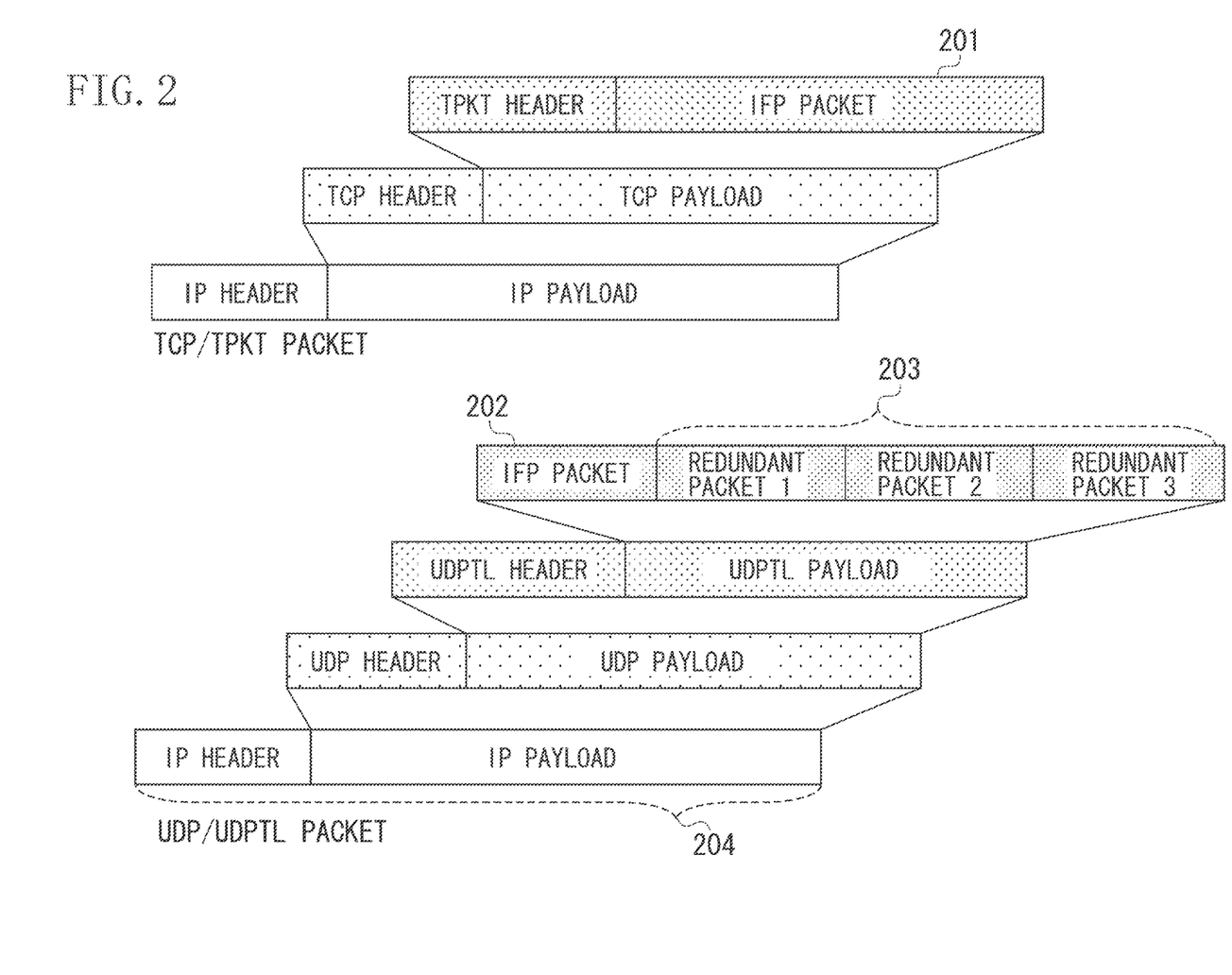
FIG. 2 illustrates examples of a packet structure.

TCP/TPKT and UDP/UDPTL packets have respective packet structures illustrated in FIG. 2. The packet structures have the following features.

The TCP/TPKT protocol is advantageous in that the packet is to be re-transmitted even when a packet loss has occurred on the IP network, so that missing data does not occur. However, the TCP/TPKT protocol is disadvantageous in that a delay occurs if the packet is retransmitted, so that the real-time property is degraded. On the other hand, the UDP/UDPTL protocol places importance on the real-time property, and the packet is not to be re-transmitted even when a packet loss occurs. Instead, to prevent missing data due to packet loss from occurring, the UDP/UDPTL protocol adds, as error recovery redundant packets 203, the data already transmitted to the packet to be subsequently transmitted, and then transmits the packet. A plurality of error recovery redundant packets 203 can be added, and even when a packet loss has occurred, the data corresponding to the number of added error recovery redundant packets 203 can be prevented from missing.

Referring to FIG. 2, T.38 data (i.e. a procedure signal and an image) is included in IFP packet portions 201 and 202. The size of the IFP packet is generally set to a little less than 300 bytes. Such a setting is based on division of data into frames according to a high-level data link control (HDLC) procedure when T.38 communication is in an error correction mode (ECM). In general, packetizing is performed in units of one frame of HDLC (i.e., 256 bytes+the header portion). When T.38 communication is in a non-ECM, in many cases, the data is segmented and packetized in a little less than 300 bytes in accordance with the ECM, or each of the coded data corresponding to 1 line of the image is packetized.

Figure 3:
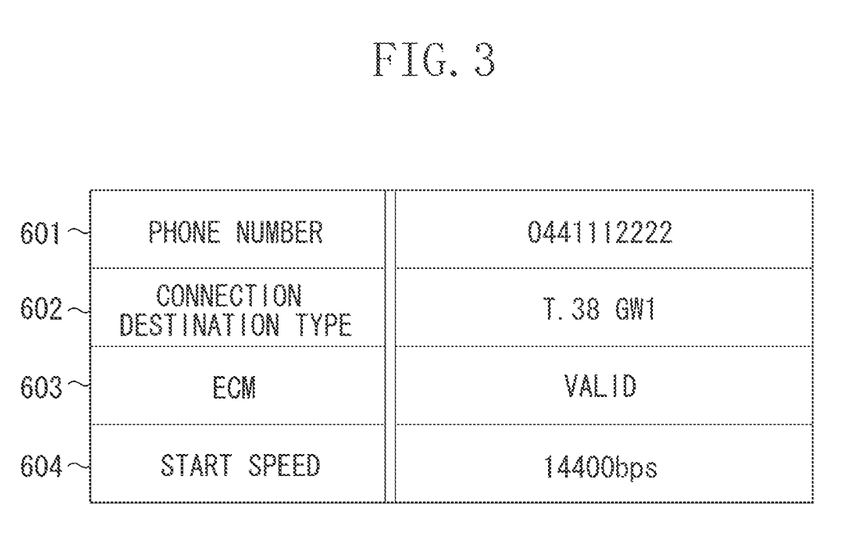
FIG. 3 illustrates an example of a data configuration of an address list.

FIG. 3 illustrates an example of the data structure of the address list. Referring to FIG. 3, the list includes a phone number 601 of the destination. A connection destination type 602 is information indicating the type of a connection destination to which a SIP INVITE signal is to be transmitted. Specifically, the connection destination type 602 includes "Intranet" indicating the SIP server, "Intranet (P2P)" indicating P2P connection, and "T.38 GW" indicating the address of the T.38 GW. If a plurality of T.38 GW addresses can be registered, "T.38 GW1" and "T.38 GW2" may be set as the connection destination types. An ECM 603 is information indicating whether the ECM is valid or invalid in performing fax communication. A start speed 604 is information indicating a transmission start speed.

The address list is an example of a phone list.

Figure 4:
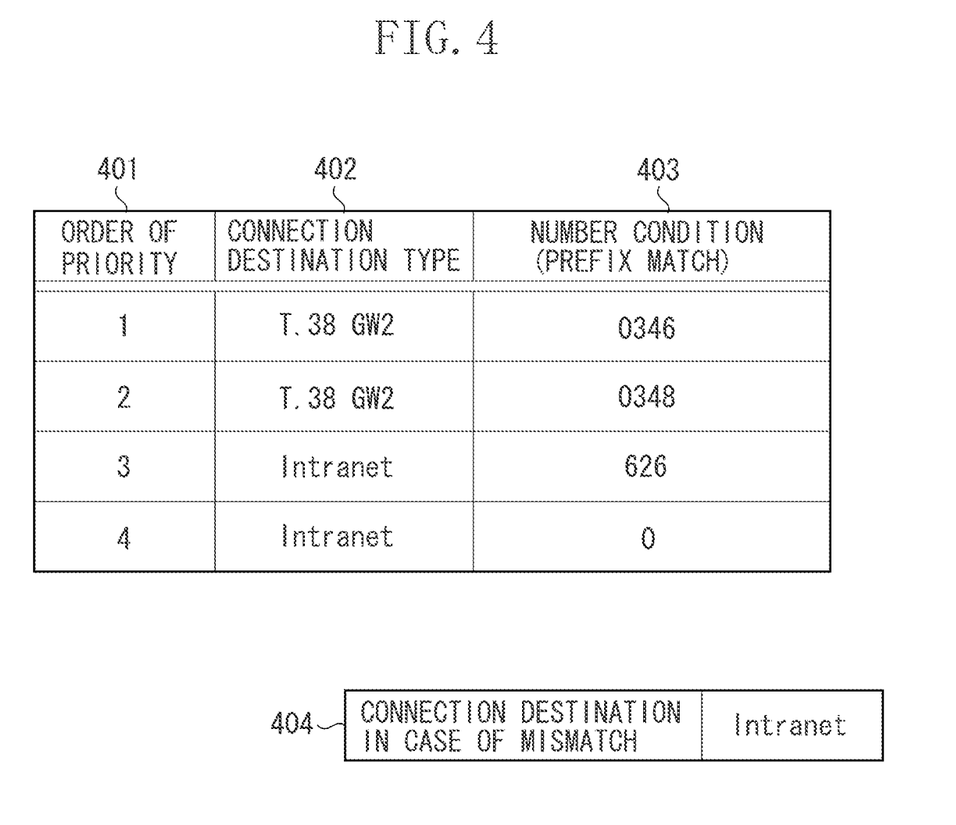
FIG. 4 illustrates an example of a priority setting for determining a connection destination type when a new address has been input.

FIG. 4 illustrates an example of a priority setting (hereinafter referred to as a priority list) for determining the connection destination type when a new address has been input.

Referring to FIG. 4, a number condition 403 to be used in a prefix search is registered in the priority list. Upon input of a new address, the IPFAX1 301 searches for the input phone number in descending order of a priority 401. If the number corresponding to the input phone number is found, the IPFAX1 301 selects the connection destination type 402 registered in the corresponding item. If the input phone number does not corresponding to any of the items in the priority list, the IPFAX1 301 determines the input new address as a connection destination in case of mismatch 404.

For example, it is assumed that a phone number 03-481-0001 is input as the new address. In such a case, the input phone number corresponds to the second item in the priority list, so that the connection destination is "T.38 GW2". Further, if the phone number 03-123-0002 is input, the phone number corresponds to the fourth item in the priority list, so that the connection destination is "Intranet". Furthermore, if the phone number 611-0003 is input, the phone number does not correspond to any of the items in the priority list, so that the connection destination is "Intranet", which is specified as the connection destination in the case of mismatch 404.

Next, an example of information processing for determining a T.38 packet size will be described below with reference to the flowchart illustrated in FIG. 5. The method for determining a transmission destination is simply one of exemplary embodiments, and other methods may be used.

Figure 5:
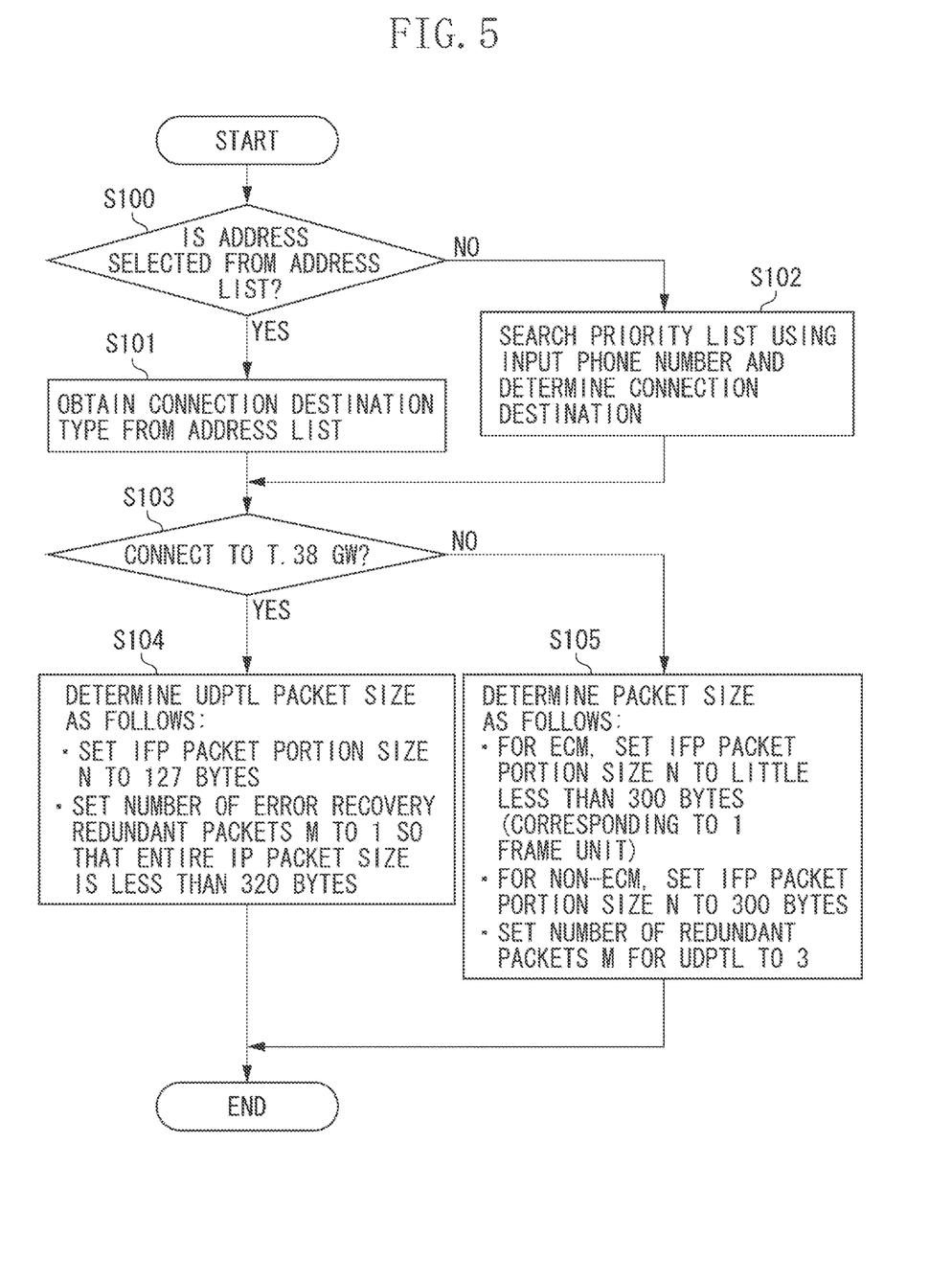
FIG. 5 is a flowchart illustrating an example of processing for determining a T.38 packet size.
Figure 6:
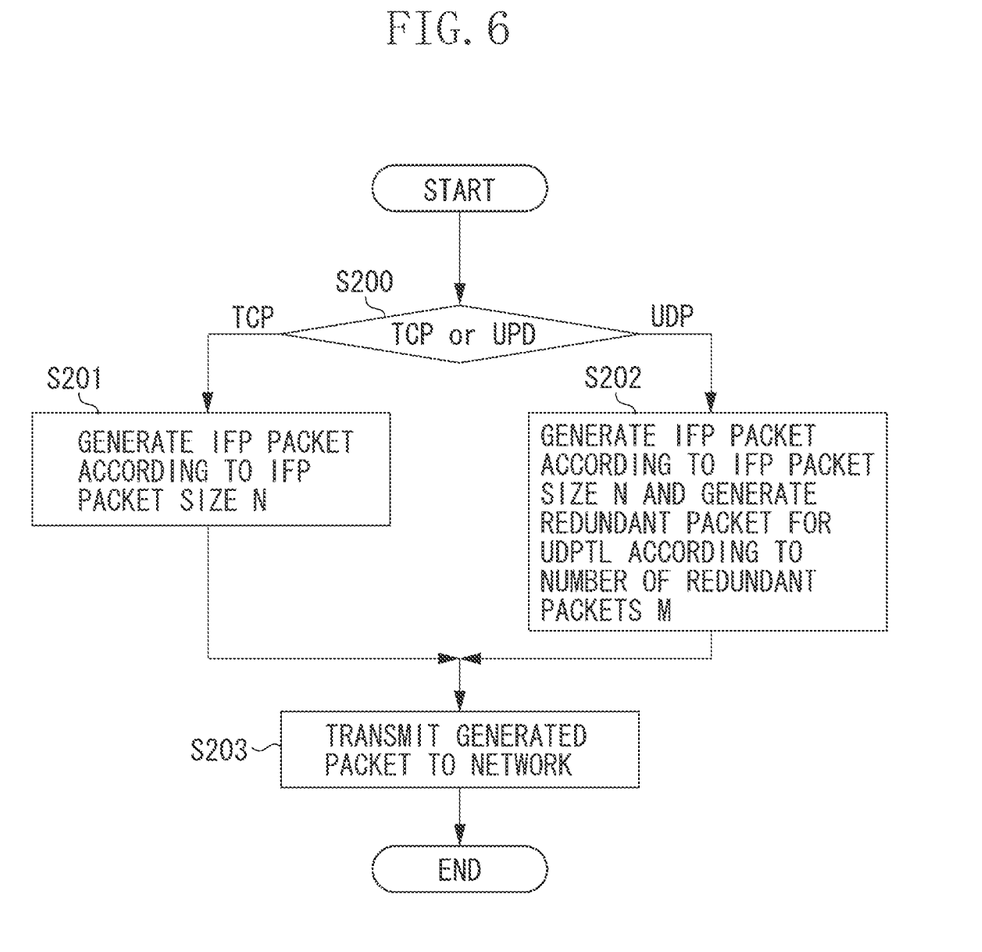
FIG. 6 is a flowchart illustrating an example of packet generation and transmission processing.

The processing in the flowcharts illustrated in FIGS. 5 and 6 is realized by the CPU 314 reading a control software program of the IPFAX1 301 from the ROM 311 or the HDD 313, loading the program into the RAM 312, and executing it.

In step S100, upon receiving an input of an address from a user, the UI 302 transmits the received information to the CPU 314. The CPU 314 then determines whether the address has been selected from the address list or is a new address in which only the phone number has been input.

If the CPU 314 determines that the address has been selected from the address list (YES in step S100), the processing proceeds to step S101. In step S101, the CPU 314 obtains the connection destination type information registered in the address list, and stores in the RAM 312 the information as a value of the connection destination.

If the CPU 314 determines that the address received from the UI 302 is a new address (NO in step S100), the processing proceeds to step S102. In step S102, the CPU 314 obtains the priority list stored in the HDD 313. The CPU 314 then performs a prefix search through the values in the number condition 403 to find the value of the phone number of the new address, in descending order of the priority 401. If the item corresponding to the value of the phone number of the new address is found in the priority list, the CPU 314 stores the value of the connection destination type 402 in the RAM 312 as the value of the connection destination. On the other hand, if there is no corresponding item as a result of searching the priority list, the CPU 314 refers to the value of the connection destination in case of mismatch 404 stored in the HDD 313, and stores the value in the RAM 312.

In step S103, the CPU 314 determines whether the connection destination stored in the RAM 312 in step S101 or step S102 is the T.38 GW 504. If the CPU 314 determines that the connection destination is the T.38 GW 504 (YES in step S103), the processing proceeds to step S104. In step S104, the CPU 314 performs the following two packet size adjustment processes. The first process is that the CPU 314 determines the size N of the IFP packet portion 202 of the UDPTL packet as 127 bytes so that the size of the IFP packet portion 202 is less than 128 bytes (i.e., less than a preset size). The second process is that the CPU 314 reduces the number of error recovery redundant packets 203 so that the size of the entire packet 204 is less than 320 bytes. In the present exemplary embodiment, the number of redundant packets M is decreased from 3 to 1.

If the CPU 314 determines that the connection destination is not the T.38 GW 504 (NO in step S103), the processing proceeds to step S105. In step S105, the CPU 314 does not reduce the packet size and determines the packet size as follows. If the mode is the ECM, the CPU 314 determines the IFP packet size N as one frame unit of HDLC (i.e., a little less than 300 bytes), and if the mode is non-ECM, the CPU 314 determines the IFP packet size N as 300 bytes. Further, the CPU 314 sets the number of redundant packets M for the UDPTL packet to 3.

FIG. 6 is a flowchart illustrating an example of packet generation and transmission processing.

In step S200, the CPU 314 determines whether the protocol of the T.38 transport layer determined at the time of SIP call connection is TCP or UDP. If the protocol is TCP (TCP in step S200), the processing proceeds to step S201. In step S201, the CPU 314 generates an IFP packet based on the IFP packet size N determined in the processing illustrated in FIG. 5.

If the protocol is UDP (UDP in step S200), the processing proceeds to step S202. In step S202, the CPU 314 generates an IFP packet and redundant packets based on the IFP packet size N and the number of redundant packets M determined in the processing illustrated in FIG. 5.

Lastly, in step S203, the CPU 314 transmits the generated packet to the network.

By performing the above-described processing, if the connection destination is the T.38 GW 504, the packet is not to be discarded on the GW side and communication can be normally performed. Further, if the connection destination is other than the T.38 GW 504, packet division is not excessively performed, so that the packet can be transmitted without lowering the throughput. Furthermore, since the packet is to be transmitted without unnecessarily reducing the number of error recovery redundant packets, the tolerance to packet loss is not lowered.

Exemplary embodiments of the present subject matter are also realized by supplying software (a program) for implementing the functions of the above described exemplary embodiments to a system or an apparatus via a network or various storage media, and causing a computer (i.e., a CPU or a micro-processing unit (MPU) in the system or the apparatus to read and execute the program.

As described above, according to each of the exemplary embodiments, communication can be normally performed when a connection destination is a gateway using a protocol for executing fax communication in real time on the IP network. Further, a throughput and a tolerance to packet loss can be prevented from lowering when the connection destination is other than the gateway.

Embodiments of the present subject matter can also be realized by a computer of a system or apparatus that reads out and executes computer executable instructions recorded on a storage medium (e.g., non-transitory computer-readable storage medium) to perform the functions of one or more of the above-described embodiment(s) of the present subject matter, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present subject matter has been described with reference to exemplary embodiments, it is to be understood that the claimed subject matter is not limited to the disclosed exemplary embodiments. The scope of the following claims is to be accorded the broadest interpretation so as to encompass all such modifications and equivalent structures and functions.

This application claims the benefit of Japanese Patent Application No. 2013-067076 filed Mar. 27, 2013, which is hereby incorporated by reference herein in its entirety.

What is claimed is:

1. A facsimile apparatus comprising:
an interface configured to connect to an IP network;
one or more processors; and
a memory storing instructions that, when executed by the one or more processors, cause the facsimile apparatus to perform operations comprising:
determining whether a facsimile communication using User Datagram Protocol (UDP) is to be performed via a gateway apparatus or without using the gateway apparatus, wherein the gateway apparatus converts a packet received from the IP network into an analog signal and transmits the analog signal to an analog network, a size enabling a packet to be received by the gateway apparatus being restricted;
performing the facsimile communication by transmitting a UDP packet via the interface by using the IP network; and
when it is determined that the facsimile communication is to be performed via the gateway apparatus and a mode of the facsimile transmission is an error correction mode, controlling to transmit the UDP packet having a size equal to or smaller than a maximal size enabling a packet to be received by the gateway apparatus, and
when it is determined that the facsimile communication is to be performed without using the gateway apparatus and the mode of the facsimile transmission is the error correction mode, controlling to be able to transmit the UDP packet having a size larger than the maximal size enabling a packet to be received by the gateway apparatus.

2. The facsimile apparatus according to claim 1, wherein the one or more processors further perform operations comprising:
receiving a user input for a phone number of a destination, wherein the determining is based on at least a portion of the input phone number.

3. The facsimile apparatus according to claim 1, wherein the one or more processors further perform operations comprising:
storing, at a storage unit, an address list,
wherein if a destination is selected from the address list, the determining is based on type information included in the address list.

4. The facsimile apparatus according to claim 1,
wherein the UDP packet transmitted via the interface includes an Internet Facsimile Protocol (IFP) packet,
wherein a size enabling the IFP packet to be received by the gateway apparatus is restricted to a size equal to or smaller than a first size, and
wherein, when it is determined that the facsimile communication is to be performed via the gateway apparatus and the mode of the facsimile transmission is the error correction mode, the controlling controls to transmit the UDP packet via the interface such that the IFP packet included in the UDP packet has a size equal to or smaller than the first size.

5. The facsimile apparatus according to claim 4,
wherein a size enabling the UDP packet that includes the IFP packet and a redundant packet for error recovery to be received by the gateway apparatus is restricted to a size equal to or smaller than a second size that is larger than the first size, and
wherein, when it is determined that the facsimile communication is to be performed via the gateway apparatus and the mode of the facsimile transmission is the error correction mode, the controlling controls to transmit the UDP packet via the interface such that a predetermined number of redundant packets is included in the UDP packet so that a size of the UDP packet is equal to or smaller than the second size.

6. The facsimile apparatus according to claim 1, wherein the UDP packet transmitted via the interface includes an Internet Facsimile Protocol (IFP) packet,
wherein, when it is determined that the facsimile communication is to be performed without using the gateway apparatus and the mode of the facsimile transmission is the error correction mode, the controlling controls to transmit, via the interface, the IFP packet being a size of one frame unit of a high-level data link control (HDLC).

7. A method for controlling a facsimile apparatus including an interface configured to connect to an IP network, the method comprising:
determining whether a facsimile communication using User Datagram Protocol (UDP) is to be performed via a gateway apparatus or without using a gateway apparatus, wherein the gateway apparatus converts a packet received from the IP network into an analog signal and transmits the analog signal to an analog network, a size enabling a packet to be received by the gateway apparatus being restricted;
performing the facsimile communication by transmitting a UDP packet via the interface by using the IP network;
performing control, when it is determined that the facsimile communication is to be performed via the gateway apparatus and a mode of the facsimile transmission is an error correction mode, to transmit the UDP packet having a size equal to or smaller than a maximal size enabling a packet to be received by the gateway apparatus, when it is determined that the facsimile communication is to be performed without using the gateway apparatus and the mode of the facsimile transmission is the error correction mode, controlling to be able to transmit the UDP packet having a size larger than the maximal size enabling a packet to be received by the gateway apparatus.

8. A non-transitory computer-readable storage medium storing instructions that, when executed, causes a computer to execute a method, the method comprising:

determining whether a facsimile communication using User Datagram Protocol (UDP) is to be performed via a gateway apparatus or without using a gateway apparatus, wherein the gateway apparatus converts a packet received from the IP network into an analog signal and transmits the analog signal to an analog network, a size enabling a packet to be received by the gateway apparatus being restricted;

performing the facsimile communication by transmitting a UDP packet via the interface by using the IP network;

performing control, when it is determined that the facsimile communication is to be performed via the gateway apparatus and a mode of the facsimile transmission is an error correction mode, to transmit the UDP packet having a size equal to or smaller than a maximal size enabling a packet to be received by the gateway apparatus, when it is determined that the facsimile communication is to be performed without using the gateway apparatus and the mode of the facsimile transmission is the error correction mode, controlling to be able to transmit the UDP packet having a size larger than the maximal size enabling a packet to be received by the gateway apparatus.

* * * * *